UNITED STATES PATENT OFFICE.

WILLIAM LOESCH, OF CHICAGO, ILLINOIS, ASSIGNOR OF FORTY ONE-HUNDREDTHS TO GEORGE B. STORER, OF CHICAGO, ILLINOIS.

FUEL-BRIQUET COMPOSITION.

1,111,800.

No Drawing.

Specification of Letters Patent. Patented Sept. 29, 1914.

Application filed April 14, 1913. Serial No. 761,125.

*To all whom it may concern:*

Be it known that I, WILLIAM LOESCH, a citizen of the United States, residing at Chicago, in the county of Cook and State of Illinois, have invented certain new and useful Improvements in Fuel-Briquet Compositions; and I do hereby declare the following to be a full, clear, and exact description of the invention, such as will enable others skilled in the art to which it appertains to make and use the same.

The invention relates to fuel briquet compositions and has for its principal object the provision of a briquet that will retain its integrity under the influence of the heat of combustion.

One of the great draw-backs to the use of briquets of pulverized fuel is that the briquet when subjected to the heat of combustion will disintegrate into a fine dust and become practically non-combustible, whereas in my improved composition a sufficient binder is provided to maintain the briquet in a block until entirely consumed and furthermore I provide a small percentage of potassium-nitrate to add to the combustible character of the briquet.

In making my improved composition I take one hundred parts by bulk, of fuel dust, such for instance as bituminous coal dust and screenings or anthracite coal dust and screenings or coke dust and screenings, or if desired I may use a part of the one hundred parts by bulk of bituminous coal dust and screenings and the remainder of anthracite coal dust and screenings, or a part of each by bulk of the three fuels heretofore mentioned. I then take twenty-five parts, by bulk, of cement and mix with this twenty-five parts of water, substantially one-half of one part, bulk, of potassium nitrate, thoroughly dissolving the salt in the water. I then take five parts, by bulk, of ordinary clay that has been finely comminuted and mix it with twenty-five (25) parts by bulk of cement, either Portland or slag, while dry and then mix the solution of potassium nitrate heretofore described with the clay and cement until thoroughly incorporated and making a substantially liquid solution. The one hundred (100) parts by bulk of fuel dust heretofore described is then mixed with the solution of water, clay, cement and potassium nitrate until thoroughly incorporated. Where coke dust is used in the composition I have found it to be advisable to use a small percentage of coal oil, substantially two parts by bulk, and this coal oil is thoroughly incorporated with the fuel dust and screenings before being mixed with the plastic composition of cement, clay, water and potassium nitrate.

As a general rule it has been found that the most satisfactory method of mixing the different ingredients, especially the last step heretofore described, is by the use of a concrete mixer of ordinary construction, but the mixing may be accomplished by hand if desired.

After the ingredients have been thoroughly mixed as heretofore described the plastic composition that results therefrom is placed in suitable molds of any desired shape and allowed to dry, this drying process requiring substantially three days, though the time may be increased by humidity in the atmosphere.

After the molded briquets have become hardened in the molds and dried thoroughly they are in condition to be utilized for fuel and may be treated in the same manner that lump coal is treated for combustion purposes.

I am aware that briquets have been made heretofore that employ cement and other binding agents to hold the particles of fuel together, but none of the briquets heretofore made have been of sufficient hardness to stand the rough usage of handling and transportation and furthermore when placed in the furnace and subjected to the heat of combustion crumble into dust and retard combustion if they do not entirely discontinue it. This integrity of the briquet is secured and maintained by the large percentage of cement in the composition, as well as the clay acting as a binder by being burned into a hard brick-like substance that prevents crumbling and disintegration. Furthermore by reason of the fact that the briquet does not crumble the particles of fuel are burned away gradually leaving a residue of fine particles of the incombustile matter which falls through the grates in the form of ash, and no clinker results from combustion. The addition of the potassium nitrate causes a more rapid ignition of the fuel dust and screenings without danger of explosion.

Having thus described my invention what I claim is:—

1. A fuel briquet composition consisting of finely comminuted fuel, a binding agent consisting of cement and finely comminuted clay, a rapid non-explosive ignition agent consisting of potassium nitrate, in substantially the proportions set forth.

2. A fuel briquet composition consisting substantially of one hundred (100) parts by bulk of finely comminuted fuel, substantially twenty-five (25) parts by bulk of cement, substantially five (5) parts by bulk of finely comminuted clay, substantially one-half (½) of one part by bulk of potassium nitrate and twenty-five (25) parts by bulk of water.

3. A fuel for briquet compositions containing substantially one hundred (100) parts by bulk of finely comminuted fuel, substantially two (2) parts by bulk of coal oil, substantially twenty-five (25) parts by bulk of cement, substantially five (5) parts by bulk of finely comminuted clay, substantially one-half (½) of one part by bulk of potassium nitrate, and substantially twenty-five (25) parts by bulk of water.

In testimony whereof I affix my signature in presence of two witnesses.

WILLIAM LOESCH.

Witnesses:
 GEORGE B. STORER,
 JOHN H. FOLEY.

Copies of this patent may be obtained for five cents each, by addressing the "Commissioner of Patents, Washington, D. C."